United States Patent
Levy et al.

(10) Patent No.: US 10,049,126 B2
(45) Date of Patent: Aug. 14, 2018

(54) CUCKOO HASHING WITH SELECTABLE HASH

(71) Applicant: Mellanox Technologies TLV Ltd., Ra'anana (IL)

(72) Inventors: Gil Levy, Hod Hasharon (IL); Pedro Reviriego, Madrid (ES); Salvatore Pontarelli, Rome (IT)

(73) Assignee: MELLANOX TECHNOLOGIES TLV LTD., Ra'anana (IL)

( * ) Notice: Subject to any disclaimer, the term of this patent is extended or adjusted under 35 U.S.C. 154(b) by 327 days.

(21) Appl. No.: 14/846,777

(22) Filed: Sep. 6, 2015

(65) Prior Publication Data

US 2017/0068669 A1    Mar. 9, 2017

(51) Int. Cl.
    *G06F 17/30* (2006.01)
    *H04L 12/743* (2013.01)

(52) U.S. Cl.
    CPC ...... *G06F 17/3033* (2013.01); *H04L 45/7453* (2013.01)

(58) Field of Classification Search
    CPC ........... G06F 17/3033; G06F 17/30949; G06F 12/1018; G06F 12/04; G06F 12/0292; H04L 45/7453; H04L 45/7457
    See application file for complete search history.

(56) References Cited

U.S. PATENT DOCUMENTS

| | | | |
|---|---|---|---|
| 6,611,875 B1 | 8/2003 | Chopra et al. | |
| 7,054,315 B2 | 5/2006 | Liao | |
| 7,061,874 B2 | 6/2006 | Merugu et al. | |
| 7,116,663 B2 | 10/2006 | Liao | |
| 7,234,019 B1 | 6/2007 | Kao et al. | |
| 8,271,564 B2 * | 9/2012 | Dade | G06F 17/30348 707/698 |
| 8,290,934 B2 * | 10/2012 | Stergiou | H04L 45/00 707/716 |

(Continued)

FOREIGN PATENT DOCUMENTS

WO    2004095784 A2    11/2004

OTHER PUBLICATIONS

Kasnavi et al., "A cache-based internet protocol address lookup architecture", Computer Networks, vol. 52, pp. 303-326, year 2008.

(Continued)

*Primary Examiner* — Jorge A Casanova
(74) *Attorney, Agent, or Firm* — D. Kligler IP Services Ltd.

(57) ABSTRACT

Decision apparatus includes a first memory bank, containing a first table of hash composition factors, and a second memory bank, containing second and third tables of associative entries. A logic pipeline receives a sequence of data items and extracts a search key from each data item. A pre-hash circuit computes a first index by applying a first hash function to the search key. A first lookup circuit reads a hash composition factor from a location in the first memory bank indicated by the first index, and a hash circuit compute second and third indices as different combinations, determined by the hash composition factor, of second and third hash functions applied by the hash circuit to the search key. A second lookup circuit reads the entries in the second and third tables that are indicated respectively by the second and third indices.

21 Claims, 3 Drawing Sheets

(56) References Cited

U.S. PATENT DOCUMENTS

| | | | |
|---|---|---|---|
| 8,305,271 B2* | 11/2012 | Li | G01S 1/042 342/386 |
| 8,619,766 B2 | 12/2013 | Wang et al. | |
| 8,856,203 B1 | 10/2014 | Schelp et al. | |
| 9,111,615 B1 | 8/2015 | Jiang | |
| 9,171,030 B1* | 10/2015 | Arad | G06F 17/3033 |
| 9,223,711 B2* | 12/2015 | Philip | G06F 12/082 |
| 9,262,312 B1 | 2/2016 | Gazit et al. | |
| 9,317,517 B2* | 4/2016 | Attaluri | G06F 17/30153 |
| 9,344,366 B2 | 5/2016 | Bouchard et al. | |
| 9,424,366 B1 | 8/2016 | Gazit et al. | |
| 9,438,505 B1 | 9/2016 | Zhou et al. | |
| 9,569,561 B2 | 2/2017 | Wildman et al. | |
| 9,659,046 B2* | 5/2017 | Sen | G06F 17/3033 |
| 9,704,574 B1 | 7/2017 | Shamis | |
| 9,779,123 B2* | 10/2017 | Sen | G06F 17/3033 |
| 9,785,666 B2* | 10/2017 | Li | G06F 17/30371 |
| 2002/0089937 A1 | 7/2002 | Venkatachary et al. | |
| 2008/0192754 A1 | 8/2008 | Ku et al. | |
| 2008/0228691 A1* | 9/2008 | Shavit | G06F 17/30949 |
| 2010/0080223 A1 | 4/2010 | Wong et al. | |
| 2013/0311492 A1* | 11/2013 | Calvignac | G06F 17/30949 707/756 |
| 2014/0006706 A1 | 1/2014 | Wang | |
| 2014/0089498 A1 | 3/2014 | Goldfarb et al. | |
| 2014/0215144 A1 | 7/2014 | Valency et al. | |
| 2014/0310307 A1 | 10/2014 | Levy et al. | |
| 2015/0058595 A1 | 2/2015 | Gura et al. | |
| 2015/0127900 A1 | 5/2015 | Dharmapurikar et al. | |
| 2015/0242429 A1 | 8/2015 | Varvello et al. | |
| 2015/0244842 A1 | 8/2015 | Laufer et al. | |
| 2017/0046395 A1 | 2/2017 | Li et al. | |
| 2017/0346765 A1 | 11/2017 | Immidi | |

OTHER PUBLICATIONS

Demetriades et al., "An Efficient Hardware-basedMulti-hash Scheme for High Speed IP Lookup", 16th IEEE Symposium on High Performance Interconnects, pp. 103-110, Aug. 26-28, 2008.

Meiners et al., "Algorithmic Approaches to Redesigning TCAM-Based Systems", Proceedings of the 2008 ACM SIGMETRICS international conference on Measurement and modeling of computer systems (SIGMETRICS '08), pp. 467-468, Jun. 2-6, 2008.

Laurence et al., "Spam Based Architecture for tcam for Low Area and Less Power Consumption", ARPN Journal of Engineering and Applied Sciences, vol. 10, No. 17, pp. 7607-7612, Sep. 2015.

Lakshminarayanan et al., "Algorithms for advanced packet classification with ternary CAMs", Proceedings of the 2005 conference on Applications, technologies, architectures, and protocols for computer communications (SIGCOMM 05), pp. 193-204, Aug. 21-26, 2005.

Levy et al., U.S. Appl. No. 14/827,373, filed Aug. 17, 2015.

Pagh, R., "Cuckoo Hashing for Undergraduates", IT University of Copenhagen, 6 pages, Mar. 27, 2006.

Pagh et al., "Cuckoo Hashing", Journal of Algorithms, vol. 51, pp. 122-144, May 2004.

Kirsch et al., "Less Hashing, Same Performance: Building a Better Bloom Filter", Random Structures and Algorithms, vol. 33, issue 2, pp. 187-218, Sep. 2008.

Kirsch et al., "More Robust Hashing: Cuckoo Hashing with a Stash", SIAM Journal on Computing, vol. 39, Issue 4, pp. 1543-1561, Sep. 2009.

Patrow, A., "General Purpose Hash Function Algorithms", 6 pages, year 2000 http://www.partow.net/programming/hashfunctions/.

Levy et al., U.S. Appl. No. 14/827,402, filed Aug. 17, 2015.

Song et al., "Fast Hash Table Lookup Using Extended Bloom Filter: An Aid to Network Processing", Proceedings of SIGCOMM Conference, Philadelphia, USA, pp. 181-192, Aug. 21-26, 2005.

Waldvogel et al., "Scalable High-Speed Prefix Matching", ACM Transactions on Computer Systems (TOCS), vol. 19, Issue 4, pp. 440-482, Nov. 2001.

Vamanan et al., "EffiCuts: optimizing packet classification for memory and throughput", Proceedings of the SIGCOMM conference, New Delhi, India, pp. 207-218, Aug. 30-Sep. 3, 2010.

Singh et al., "Packet classification using multidimensional cutting", Proceedings of SIGCOMM Conference, Karlsrube, German, pp. 213-224, Aug. 25-29, 2003.

Taylor et al., "ClassBench: a packet classification benchmark", WUCSE-2004-28, Applied Research Laboratory Department of Computer Science and Engineering, Washington University, Saint Louis, USA, 37 pages, May 21, 2004.

U.S. Appl. No. 14/827,373 office action dated Oct. 6, 2017.

European Application # 17189940 search report dated Jan. 26, 2018.

Hua et al., "Variable-Stride Multi-Pattern Matching For Scalable Deep Packet Inspection", IEEE INFOCOM, pp. 415-423, Rio de Janeiro, Brazil, Apr. 19-25, 2009.

\* cited by examiner

CUCKOO HASHING WITH SELECTABLE HASH

FIELD OF THE INVENTION

The present invention relates generally to circuits and methods for efficient data lookup and classification, and particularly to the use of hash tables in this context.

BACKGROUND

Hash tables are widely used in computer applications, communications, and logic circuits to implement associative arrays, i.e., data structures that map keys to values. For example, hash tables are used in network switching elements, such as bridges and routers, to map keys that are derived from specified header fields of packets received by the switching element to instructions that are to be applied in forwarding the packets by the switching element. Many other applications of hash tables are known in the art.

A hash table uses a hash function to compute, for each key, an index to a "slot" in an array where the desired value is held. Such hash functions are chosen so as to provide a uniform distribution of hash results, and thus minimize the number of collisions between different keys, i.e., occurrences in which the hash function maps two (or more) keys to the same slot. Most hash table designs assume that collisions will occur and provide techniques for accommodating collisions and minimizing their effect on lookup performance. Arash Partow gives a useful survey of hashing techniques and definitions of available hash functions on the "hash functions" page of the "programming" section in the partow.net Web site.

One useful approach to avoidance of collisions is "cuckoo hashing," described by Pagh and Rodler in an article entitled "Cuckoo Hashing," *Journal of Algorithms* 51 (2004), pages 122-144. As described by the authors, cuckoo hashing uses two hash tables, $T_1$ and $T_2$, each accessed by a different, respective hash function, $h_1$ or $h_2$. When inserting a new element with key x into the tables, both $h_1(x)$ and $h_2(x)$ are computed, and if one of the corresponding slots is vacant, the value for x is inserted there. (Either slot may be chosen if both are vacant.) When both slots are occupied, however, the current occupant of one of the slots, for example, an existing element with key y, such that $h_1(y)=h_1(x)$, is ejected from its slot and moved to the slot with index $h_2(y)$. If this latter slot is also occupied (for example, by an element with key z such that $h_2(z)=h_2(y)$), this process of ejection and replacement will continue until a vacant slot is found or until a predefined timeout period has expired. In the latter case, the tables will be recomputed using new hash functions.

SUMMARY

Embodiments of the present invention that are described hereinbelow provide improved techniques for data lookup using hash tables.

There is therefore provided, in accordance with an embodiment of the invention, decision apparatus, including a first memory bank, containing a first table of hash composition factors, and a second memory bank, containing second and third tables of associative entries, each entry including a respective entry key and a respective value. A logic pipeline is configured to receive a sequence of data items, and to extract a search key from each data item. The logic pipeline includes a pre-hash circuit, configured to compute a first index by applying a first hash function to the search key, and a first lookup circuit, which is coupled to read a hash composition factor from a location in the first memory bank indicated by the first index. A hash circuit is configured to compute second and third indices as different combinations, determined by the hash composition factor, of second and third hash functions applied by the hash circuit to the search key. A second lookup circuit is configured to read the entries in the second and third tables that are indicated respectively by the second and third indices, and upon finding a match between the search key and the respective entry key in an indicated entry, to output the respective value from the indicated entry.

In some embodiments, the hash composition factor includes at least three bits. In a disclosed embodiment, for a given search key x and hash composition factor s, the hash circuit computes the second index as $h_1(x)=A(x)+2s*B(x)$, and the third index as $h_2(x)=A(x)+(2s+1)*B(x)$, wherein $A(x)$ and $B(x)$ are the second and third hash functions, respectively.

Typically, each of the second and third tables in the second memory bank contains multiple ways, and the second lookup circuit is configured to read and match the entries in all of the ways that are indicated by the second and third indices.

In some embodiments, the data items include data packets received from a network, and the search key includes a sequence of bits extracted from selected fields in the data packets. In a disclosed embodiment, the apparatus includes multiple ports connected to the network, and decision logic, which includes the logic pipeline and is coupled to forward the data packets among the ports responsively to the respective value that is output by the second lookup circuit for each of the data packets.

In some embodiments, the apparatus includes a processor, which is coupled to insert the values of the hash composition factor into the first table and the associative entries into the second and third tables in accordance with a cuckoo hashing procedure. Typically, the processor is configured, upon receiving a new entry for insertion into the second memory bank, to apply the first hash function to the respective entry key in order to compute the first index for the new entry, and to read the hash composition factor indicated by the first index. The processor is configured to compute the second and third indices using the hash composition factor, and when a position indicated by one of the second or third indices in the second and third tables, respectively, is vacant, to place the new entry in the vacant position.

In the disclosed embodiments, the processor is configured to maintain, for each slot in the first table, a count of the entries in the second and third tables for which the first index points to the slot. The processor is configured, when the count for the slot indicated by the first index is zero, and neither of the positions indicated by the second and third indices computed using the hash composition factor in the slot indicated by the first index is vacant, to insert a new hash composition factor into the slot in the first table, to compute new second and third indices using the new hash composition factor, and to place the new entry in a new position indicated by the new second or third index. Typically, the processor is configured, when the count for the slot indicated by the first index is not zero, and neither of the positions indicated by the second and third indices computed using the hash composition factor in the slot indicated by the first index is vacant, to eject an existing entry from one of the positions indicated by the second and third indices, to insert the new entry into the one of the positions in place of the ejected entry, and to find a new position in one of the second and third tables for the ejected entry.

There is also provided, in accordance with an embodiment of the invention, a method for data lookup, which includes storing a first table of hash composition factors in a first memory bank, and storing second and third tables of associative entries in a second memory bank, each entry including a respective entry key and a respective value. A sequence of data items is received, and a search key is extracted from each data item in the sequence. A first index is computed by applying a first hash function to the search key. A hash composition factor is read from a location in the first memory bank indicated by the first index. Second and third indices are computed as different combinations, determined by the hash composition factor, of second and third hash functions applied to the search key. The entries in the second and third tables that are indicated respectively by the second and third indices are read, and upon finding a match between the search key and the respective entry key in an indicated entry, the respective value is outputted from the indicated entry.

There is additionally provided, in accordance with an embodiment of the invention, a computer software product, including a non-transitory computer-readable medium in which program instructions are stored, which instructions, when read by a computer, cause the computer to access a first table of hash composition factors stored in a first memory bank, and to access second and third tables of associative entries in a second memory bank, each entry including a respective entry key and a respective value. The instructions cause the computer to receive a sequence of data items, and extract a search key from each data item in the sequence, to compute a first index by applying a first hash function to the search key, to read a hash composition factor from a location in the first memory bank indicated by the first index, to compute second and third indices as different combinations, determined by the hash composition factor, of second and third hash functions applied to the search key, to read the entries in the second and third tables that are indicated respectively by the second and third indices, and upon finding a match between the search key and the respective entry key in an indicated entry, to output the respective value from the indicated entry.

The present invention will be more fully understood from the following detailed description of the embodiments thereof, taken together with the drawings in which:

DETAILED DESCRIPTION OF EMBODIMENTS

A key advantage of cuckoo hashing is that it can achieve high utilization of the memory space that is available for hash tables: By ejecting and replacing table entries as described above, it is possible to populate a large percentage of the available slots, and thus the memory area required to contain a given corpus of entries is reduced relative to other hashing techniques that are known in the art. Even so, to maximize occupancy of available memory using conventional cuckoo hashing techniques, it is generally necessary to use multiple memory banks, each containing multiple ways (for example, four two-way banks or two four-way banks). An additional content-addressable memory (CAM) may also be needed to hold entries for which the cuckoo insertion process failed due to repeated collisions with existing entries in the hash tables. These constraints increase the size, complexity and power consumption of the overall memory and associated logic circuits that are required in order to implement a conventional cuckoo hashing scheme.

Embodiments of the present invention that are described herein provide a new approach to hash lookup, using a pre-processing circuit and memory bank to reduce logic complexity and maximize table occupancy. The disclosed embodiments build hash tables using an ejection/replacement technique, drawing on the principles of cuckoo hashing, as described in detail hereinbelow. Alternative embodiments may be based on other sorts of multiple-choice hash techniques, such as d-left hashing, as well as double hashing. In a disclosed embodiment, these hash table construction and lookup techniques are used by a network element, such as a switch, in making packet forwarding decisions. The principles of the present invention, however, may alternatively be used to enhance memory use and logic efficiency in other hashing applications, as are known in the art.

In the disclosed embodiments, decision apparatus comprises a first memory bank, containing a table of hash composition factors (for use in hash computations, as explained below), and a second memory bank, containing at least two tables of associative entries, each entry comprising an entry key and a value. The tables are addressed by a logic pipeline, using search keys extracted from a sequence of data items, such as data packets.

The pipeline comprises a preprocessing circuit (also referred to herein as a "pre-hash circuit"), which applies a first hash function to each search key in order to compute an index that indicates the location in the first memory bank from which a hash composition factor is to be read. A hash circuit then computes two or more different hash functions of the search key, and uses the hash composition factor in combining the results of the different hash functions to generate a number of different table indices, equal to the number of tables in the second memory bank. The inventors have found the present techniques to work well and achieve high memory occupancy with two tables of associative entries, and thus with two different table indices composed, using the hash composition factor, from two different hash functions; but larger numbers of tables and corresponding indices may alternatively be used. It is also advantageous that the tables contain multiple ways, i.e., multiple entries per index, for example, two ways per table. In general, however, hash tables that are constructed and accessed using the methods described herein require fewer tables (and hence fewer different hash functions and memory banks) than do methods known in the art to achieve a given level of memory utilization.

A lookup circuit reads the table entries in the second memory bank that are indicated respectively by the two (or more) indices. Upon finding a match between the search key and the respective entry key in one of the indicated entries, the lookup circuit outputs the respective value from the table. When the memory bank contains multiple ways, the lookup circuit reads and matches the entries in all of the ways of the slots that are indicated by the indices. The value output by the lookup circuit may be, for example, an address in a table containing actions to be performed on the received data items, such as packet forwarding decisions.

For the sake of computational efficiency, the hash composition factors in the first memory bank typically have small values, for example between two and eight bits, or specifically three bits in a disclosed embodiment. For a given search key x and hash composition factor s, the hash circuit can compute one of the table indices as $h_1(x)=A(x)+2s*B(x)$, and the other index as $h_2(x)=A(x)+(2s+1)*B(x)$, wherein $A(x)$ and $B(x)$ are the two different hash functions. (The computations are typically performed in modular arithmetic, for example, mod m, wherein m is the table size.) These sorts of linear combinations of the hash functions are easy to compute, but alternatively, the hash circuit may compute other sorts of combinations of the hash functions.

Figure 1:
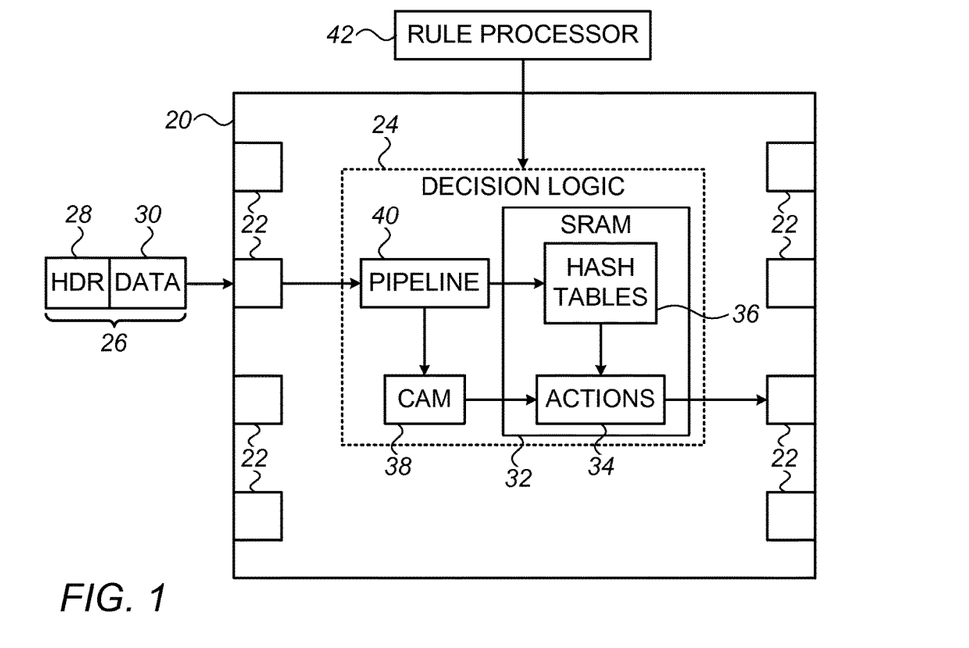
FIG. 1 is block diagram that schematically illustrates a packet switch, in accordance with an embodiment of the invention.

FIG. 1 is a block diagram that schematically illustrates a network element 20, which operates as packet decision and forwarding apparatus in accordance with an embodiment of the invention. Network element 20 can be configured as a network bridge or router, for example, with multiple ports 22 connected to a packet communication network. Decision logic 24 within element 20 forwards data packets 26 between ports 22, and may also perform other actions, such as encapsulation and de-capsulation, security filtering, and/or quality-of-service functions. The circuitry needed for carrying out such forwarding and other functions will be apparent to those skilled in the art and is omitted from the figures for the sake of simplicity, in order to concentrate on the actual decision functions of logic 24.

In the pictured embodiment, decision logic 24 receives packet 26 containing a header 28 and payload data 30. A processing pipeline 40 in decision logic 24 extracts a search key from each packet 26, typically (although not necessarily) including the contents of certain fields of header 28. For example, the key may comprise the source and destination addresses and ports and a protocol identifier. Pipeline 40 matches the key against hash tables 36 containing a set of associative entries, which are stored in a memory, such as a static random access memory (SRAM) 32 in network element 20, as described in detail hereinbelow. SRAM 32 also contains a list of actions 34 to be performed when a key is found to match one of the rule entries. For this purpose, each entry in hash tables 36 typically contains a pointer to the particular action that logic 24 is to apply to packet 26 in case of a match. Hash tables 36 may be used, inter alia, in applying packet classification rules.

In addition, decision logic 24 typically comprises a content-addressable memory (CAM 38), which contains associative entries that have not been incorporated into hash tables 36 in SRAM 32. CAM 38 may contain, for example, entries that have recently been added to network element 20 and not yet incorporated into the data structure of hash tables 36, and/or entries that were ejected from their slots in tables 36 and for which a new slot was not found within a predefined timeout period. The entries in CAM 38 likewise point to corresponding actions 34 in SRAM 32. Pipeline 40 may match the classification keys of all incoming packets 26 against both hash tables 36 in SRAM 32 and CAM 38. Alternatively, CAM 38 may be addressed only if a given classification key does not match any of the entries in hash tables 36.

Pipeline 40 typically comprises dedicated or programmable hardware logic, which is configured to carry out the functions described herein. Pipeline 40 typically also contains at least one bank of dedicated memory for implementation of the table of hash composition factors that is described below. For example, pipeline 40 may comprise a suitable application-specific integrated circuit (ASIC). Alternatively or additionally, at least some of the functions of pipeline 40 may be implemented in a standalone or embedded microprocessor.

In the example shown in FIG. 1, a rule processor 42 is responsible for inserting associate elements received by network element 20 into hash tables 36, using the modified cuckoo hashing procedure that is described herein. Processor 42 performs its functions under the control of software instructions, which are typically stored in tangible, non-transitory computer-readable storage media, such as electronic, optical, or magnetic memory media. Rule processor 42 may be integrated into network element 20, or it may be implemented as a separate, offline component.

Figure 2:
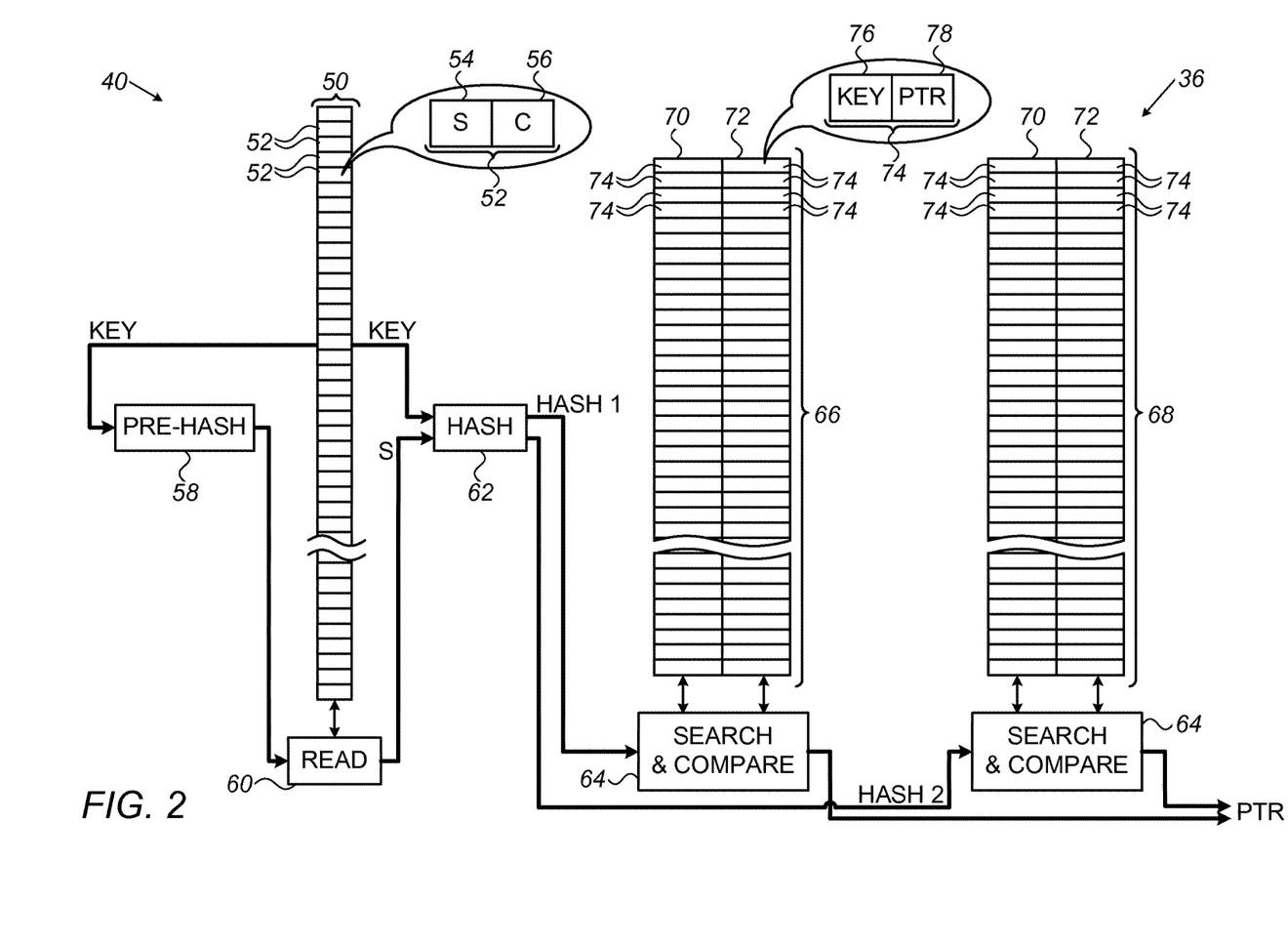
FIG. 2 is a block diagram that schematically illustrates hashing circuits and tables, in accordance with an embodiment of the invention.

FIG. 2 is a block diagram that schematically illustrates hashing circuits and tables in logic 40 and SRAM 32, in accordance with an embodiment of the invention. Logic pipeline 40 extracts a search key, x, from each incoming packet 26, and a pre-hash circuit 58 applies a suitable hash function to the key, $h_s(x)$, in order to generate an index to an auxiliary hash table 50. Table 50 may be held in SRAM 32 or in a dedicated memory array within the logic pipeline.

Each entry 52 in table 50 contains a hash composition factor 54, referred to as s, and a counter value 56, labeled c. In an example embodiment, table 50 contains 32K entries 52, wherein each entry contains seven bits (s=three bits and c=four bits). Alternatively, table structures and entries of different sizes may be used, depending upon application requirements. Counter value 56 is used in construction of tables 50 and 36 but is not required for table access by pipeline 40. The counter values may therefore be held in a different data structure, separate from table 50, but they are illustrated in FIG. 2 as a part of entries 52 for the sake of conceptual clarity.

A lookup circuit 60 reads out the value of composition factor 54, s, that is indicated by the hash value $h_s(x)$ calculated by circuit 58 and inputs this value to a hash circuit 62. Circuit 62 applies two different hash functions $A(x)$ and $B(x)$ to the search key x, and computes two indices, $h_1(x)$ and $h_2(x)$ (shown in the figure as HASH1 and HASH2), as different combinations of $A(x)$ and $B(x)$. The combinations are determined by the hash composition factor s. For example, the inventors have found it convenient to use indices $h_1(x)=A(x)+2s*B(x)$ and $h_2(x)=A(x)+(2s+1)*B(x)$. (The computations are typically performed in modular arithmetic, for example, mod m, wherein m is the size of the table.) Substantially any suitable hash functions that are known in the art may be used as $A(x)$ and $B(x)$. For example, $A(x)$ may comprise the sixteen lower bits of a 32-bit cyclic redundancy code (CRC) computed over x, while $B(x)$ comprises the sixteen higher bits. (The 32-bit CRC can be generated by the well-known polynomial $x^{32}+x^{26}+x^{23}+x^{16}+x^{12}+x^{11}+x^{10}+x^8+x^7+x^5+x^4+x^2+X+1$.) As another example, $A(x)$ and $B(x)$ may respectively comprise the Robert Sedgwicks and Justin Sobel hash functions, as defined in the above-mentioned partow.net Web site. Alternatively, substantially any uncorrelated pair of suitable hash functions may be used.

Additional lookup circuits 64 use the indices $h_1(x)$ and $h_2(x)$ to read corresponding entries 74 from tables 66 and 68, which make up hash tables 36 in SRAM 32. In the pictured example, each of tables 66 and 68 comprises two ways 70 and 72. Each entry 74 in each of the ways comprises an entry key 76 and a pointer value 78. For example, each way 70, 72 in each of tables 66 and 68 may comprise 8K entries 74, with 128 bits in each entry. Alternatively, larger or smaller entries and tables may be used.

Lookup circuits 64 compare the search key x to entry key 76 in each of the entries indicated by $h_1(x)$ and $h_2(x)$ in tables 66 and 68. Upon finding a match between the search key and the respective entry key in an indicated entry 74, circuits 64 output pointer value 78 from the indicated entry. Typically, decision logic 24 uses the pointer value to select one of actions 34, and then handles the corresponding packet accordingly.

Figure 3:
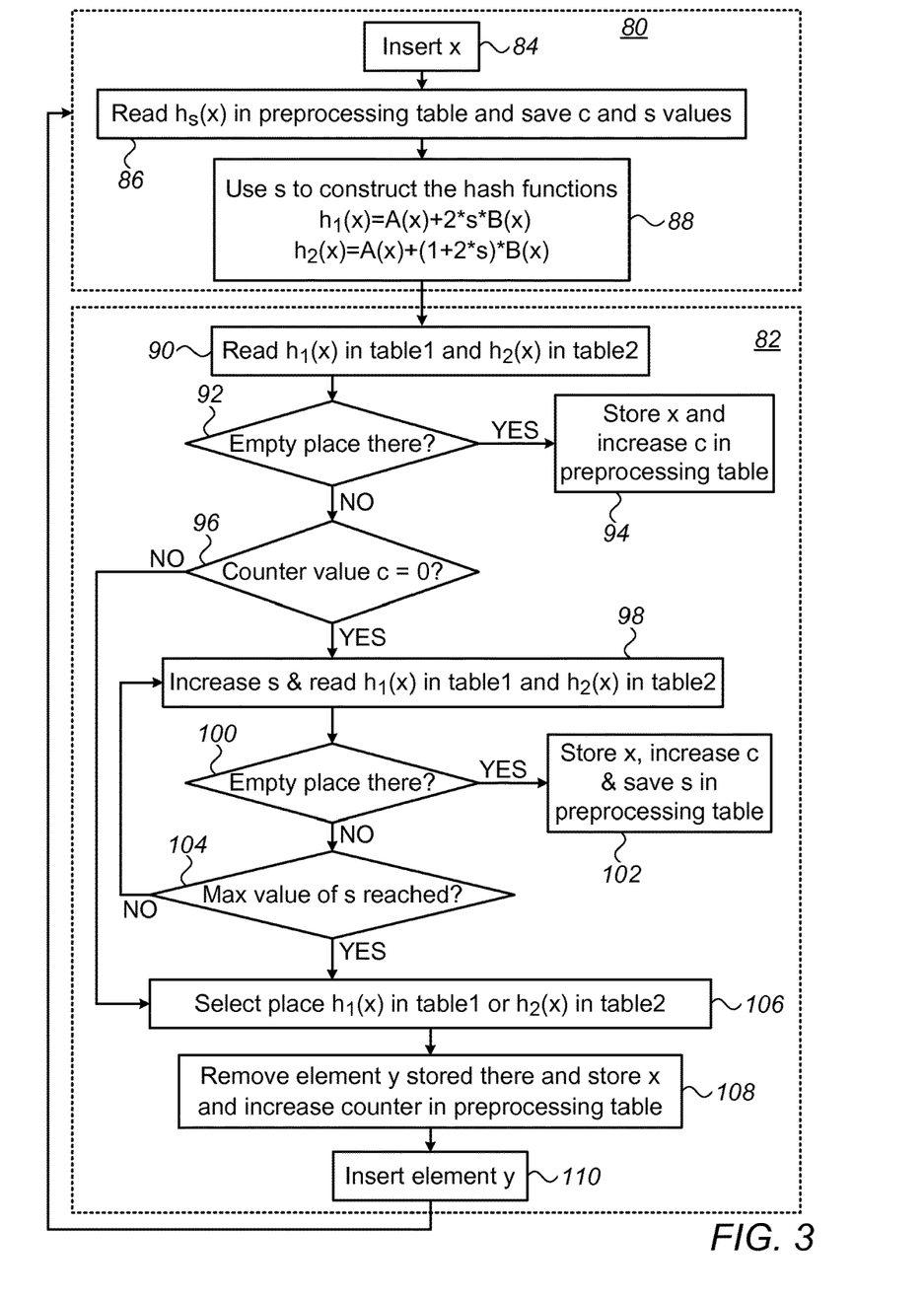
FIG. 3 is a flow chart that schematically illustrates a method for populating a hash table, in accordance with an embodiment of the invention.

FIG. 3 is a flow chart that schematically illustrates a method for populating hash tables 50, 66 and 68, in accordance with an embodiment of the invention. For each new associative entry 74 that is to be inserted into tables 66 and 68, the method includes two stages: a hash computation stage 80 and an entry insertion stage 82. Initially, factor 54(s) and a counter value 56(c) are set to zero in all entries 52 in table 50, but subsequently these entries are updated as described below. In the description that follows, it is assumed, for the sake of clarity, that the method is carried out by processor 42 in the context of the components of network element 20, but this technique for hash table construction by modified cuckoo hashing can alternatively be implemented by other sorts of processors in other system configurations.

The method of FIG. 3 is initiated when processor 42 receives a new entry 74 for insertion into the hash tables, at an entry insertion step 84. Processor 42 reads the entry key x and then computes the hash function $h_s(x)$, which serves as an index to read the corresponding entry 52 from table 50, at a factor reading step 86. The processor holds the values of s and c for subsequent use and possible modification in stage 82. Processor 42 uses the hash composition factor s to compute the indices $h_1(x)=A(x)+2s*B(x)$ and $h_2(x)=A(x)+(2s+1)*B(x)$, as explained above, at an index computation step 88.

Using these indices, processor 42 reads the corresponding entries 74 from ways 70 and 72 in tables 66 and 68, at an entry reading step 90. The processor checks whether any of these entry slots is currently empty, at a vacancy checking step 92. If so, processor 42 simply stores the current entry in the vacant slot, at an entry writing step 94. (If multiple slots are found to be vacant at step 92, processor 42 chooses one of them at random or according to some other predefined selection rule.) Processor 42 also increments the value of c (counter value 56) in entry 52 that it read at step 86. Counter value 56 in any given entry 52 thus represents a count of entries 74 in tables 66 and 68 for which the index $h_s(x)$ points to the slot of the given entry 52 in table 50.

On the other hand, upon failing to find a vacant slot in either of tables 66 and 68 at step 92, processor 42 checks counter value 56, c, in entry 52 that it read at step 86, at a counter checking step 96. If c=0, processor 42 increments the value s of composition factor 54 in this entry 52 of table 50, and computes new indices $h_1(x)$ and $h_2(x)$ (as defined above), using the new value of s, at a factor incrementation step 98. Using these new indices, processor 42 reads the corresponding entries 74 in tables 66 and 68, and checks whether any of these new entry slots are currently empty, at a new vacancy checking step 100. If so, processor 42 stores the current entry in one of these vacant slots, at a new entry writing step 102. To complete step 102, processor 42 increments c (counter value 56) in entry 52 that it read at step 86 and also saves the updated value of s in this entry.

On the other hand, when processor 42 fails to find a vacant slot at step 100, as well, it checks whether s has reached its maximum possible value (seven, in the current example in which factor 54 comprises three bits), at a factor checking step 104. If not, processor 42 returns to step 98 and increments s once more. This use of multiple values of the hash composition factor s effectively increases the number of different hashes that can be applied in accessing tables 66 and 68, and thus enables very high occupancy of the tables to be achieved without substantially increasing the complexity of pipeline 40.

Processor 42 carries out the procedure described above in steps 98-104 when counter value 56, c, is found to be zero at step 96. (For this reason, it can be beneficial that table 50 contain a large number of entries 52, in order to increase the likelihood of finding c=0.) In the alternative, when c is found at step 96 to be non-zero, or when s reaches its maximum value at step 104 without having found a vacant slot, processor 42 reverts to cuckoo hashing, at a slot selection step 106. In this step, the processor selects one of the occupied slots in table 66 or 68, indicated by either $h_1(x)$ or $h_2(x)$ (using the current value of s). Processor 42 ejects the existing entry, y, from this position, and stores entry x in its place, at a cuckoo replacement step 108. The processor increments c in entry 52 that it read back at step 86 and also decrements c in the entry in table 50 corresponding to $h_s(y)$, for the ejected entry.

Processor 42 then proceeds to find a new slot for the ejected entry y, at a further insertion step 110. The method now returns to stage 80 and proceeds as described above until the ejected entry has been reinserted in one of tables 66 and 68. In the event that no vacant slot is found for an ejected entry after a predefined number of iterations through stages 80 and 82, the last ejected entry may be stored in CAM 38 instead, or tables 50, 66 and 68 may be recompiled using new hash functions A and B.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A memory apparatus, comprising:
a first memory bank, containing a first table of hash composition factors;
a second memory bank, containing second and third tables of associative entries, each entry comprising a respective entry key and a respective value; and
a logic pipeline, which is configured to receive a sequence of data items, and to extract a search key from each data item, and which comprises:
a pre-hash circuit, configured to compute a first index by applying a first hash function to the search key;
a first lookup circuit, which is coupled to read a hash composition factor from a location in the first memory bank indicated by the first index;
a hash circuit, which is configured to compute second and third indices as different combinations, determined by the hash composition factor, of second and third hash functions applied by the hash circuit to the search key; and
a second lookup circuit, which is configured to read the entries in the second and third tables that are indicated respectively by the second and third indices, and upon finding a match between the search key and the respective entry key in an indicated entry, to output the respective value from the indicated entry.

2. The apparatus according to claim 1, wherein the hash composition factor comprises at least three bits.

3. The apparatus according to claim 2, wherein for a given search key x and hash composition factor s, the hash circuit computes the second index as $h_1(x)=A(x)+2s*B(x)$, and the third index as $h_2(x)=A(x)+(2s+1)*B(x)$, wherein $A(x)$ and $B(x)$ are the second and third hash functions, respectively.

4. The apparatus according to claim 1, wherein each of the second and third tables in the second memory bank contains multiple ways, and wherein the second lookup circuit is configured to read and match the entries in all of the ways that are indicated by the second and third indices.

5. The apparatus according to claim 1, wherein the data items comprise data packets received from a network, and the search key comprises a sequence of bits extracted from selected fields in the data packets.

6. The apparatus according to claim 5, and comprising:
multiple ports connected to the network; and
decision logic, which comprises the logic pipeline and is coupled to forward the data packets among the ports responsively to the respective value that is output by the second lookup circuit for each of the data packets.

7. The apparatus according to claim 1, and comprising a processor, which is coupled to insert the values of the hash composition factor into the first table and the associative entries into the second and third tables in accordance with a cuckoo hashing procedure.

8. The apparatus according to claim 7, wherein the processor is configured, upon receiving a new entry for insertion into the second memory bank, to apply the first hash function to the respective entry key in order to compute the first index for the new entry, and to read the hash composition factor indicated by the first index, and
wherein the processor is configured to compute the second and third indices using the hash composition factor, and when a position indicated by one of the second or third indices in the second and third tables, respectively, is vacant, to place the new entry in the vacant position.

9. The apparatus according to claim 8, wherein the processor is configured to maintain, for each slot in the first table, a count of the entries in the second and third tables for which the first index points to the slot, and
wherein the processor is configured, when the count for the slot indicated by the first index is zero, and neither of the positions indicated by the second and third indices computed using the hash composition factor in the slot indicated by the first index is vacant, to insert a new hash composition factor into the slot in the first table, to compute new second and third indices using the new hash composition factor, and to place the new entry in a new position indicated by the new second or third index.

10. The apparatus according to claim 9, wherein the processor is configured, when the count for the slot indicated by the first index is not zero, and neither of the positions indicated by the second and third indices computed using the hash composition factor in the slot indicated by the first index is vacant, to eject an existing entry from one of the positions indicated by the second and third indices, to insert the new entry into the one of the positions in place of the ejected entry, and to find a new position in one of the second and third tables for the ejected entry.

11. A method for data lookup, comprising:
storing a first table of hash composition factors in a first memory bank;
storing second and third tables of associative entries in a second memory bank, each entry comprising a respective entry key and a respective value;
receiving a sequence of data items, and extracting a search key from each data item in the sequence;
computing a first index by applying a first hash function to the search key;
reading a hash composition factor from a location in the first memory bank indicated by the first index;
computing second and third indices as different combinations, determined by the hash composition factor, of second and third hash functions applied to the search key;
reading the entries in the second and third tables that are indicated respectively by the second and third indices; and
upon finding a match between the search key and the respective entry key in an indicated entry, outputting the respective value from the indicated entry.

12. The method according to claim 11, wherein the hash composition factor comprises at least three bits.

13. The method according to claim 12, wherein computing the second and third indices comprises, for a given search key x and hash composition factor s, computing the second index as $h_1(x)=A(x)+2s*B(x)$, and the third index as $h_2(x)=A(x)+(2s+1)*B(x)$, wherein $A(x)$ and $B(x)$ are the second and third hash functions, respectively.

14. The method according to claim 11, wherein each of the second and third tables in the second memory bank contains multiple ways, and wherein reading the entries in the second and third tables comprises reading and matching the entries in all of the ways that are indicated by the second and third indices.

15. The method according to claim 11, wherein the data items comprise data packets received from a network, and the search key comprises a sequence of bits extracted from selected fields in the data packets.

16. The method according to claim 15, and comprising forwarding the data packets responsively to the respective value that is outputted from the indicated entry.

17. The method according to claim 11, and comprising inserting the values of the hash composition factor into the first table and the associative entries into the second and third tables in accordance with a cuckoo hashing procedure.

18. The method according to claim 17, wherein inserting the associative entries comprises, upon receiving a new entry for insertion into the second memory bank:
applying the first hash function to the respective entry key in order to compute the first index for the new entry;
reading the hash composition factor indicated by the first index;
computing the second and third indices for the new entry using the hash composition factor; and
when a position indicated by one of the second or third indices in the second and third tables, respectively, is vacant, placing the new entry in the vacant position.

19. The method according to claim 18, wherein the method comprises maintaining, for each slot in the first table, a count of the entries in the second and third tables for which the first index points to the slot, and
wherein inserting the values of the hash composition factor into the first table and the associative entries into the second and third tables comprises, when the count for the slot indicated by the first index is zero, and neither of the positions indicated by the second and third indices computed using the hash composition factor in the slot indicated by the first index is vacant:

inserting a new hash composition factor into the slot in the first table;

computing new second and third indices using the new hash composition factor; and placing the new entry in a new position indicated by the new second or third index.

20. The method according to claim 19, wherein inserting the associative entries comprises, when the count for the slot indicated by the first index is not zero, and neither of the positions indicated by the second and third indices computed using the hash composition factor in the slot indicated by the first index is vacant:

ejecting an existing entry from one of the positions indicated by the second and third indices;

inserting the new entry into the one of the positions in place of the ejected entry; and finding a new position in one of the second and third tables for the ejected entry.

21. A computer software product, comprising a non-transitory computer-readable medium in which program instructions are stored, which instructions, when read by a computer, cause the computer to access a first table of hash composition factors stored in a first memory bank, and to access second and third tables of associative entries in a second memory bank, each entry comprising a respective entry key and a respective value, wherein the instructions cause the computer to receive a sequence of data items, and extract a search key from each data item in the sequence, to compute a first index by applying a first hash function to the search key, to read a hash composition factor from a location in the first memory bank indicated by the first index, to compute second and third indices as different combinations, determined by the hash composition factor, of second and third hash functions applied to the search key, to read the entries in the second and third tables that are indicated respectively by the second and third indices, and upon finding a match between the search key and the respective entry key in an indicated entry, to output the respective value from the indicated entry.

* * * * *